United States Patent
Cardona et al.

(10) Patent No.: US 9,166,914 B2
(45) Date of Patent: Oct. 20, 2015

(54) FIFO AFFINITY FOR MULTIPLE PORTS

(71) Applicant: International Business Machines Corporation, Armonk, NY (US)

(72) Inventors: Omar Cardona, Cedar Park, TX (US); Andres Herrera, Austin, TX (US); Pedro V. Torres, Pflugerville, TX (US); Rafael Velez, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 30 days.

(21) Appl. No.: 14/100,778

(22) Filed: Dec. 9, 2013

(65) Prior Publication Data

US 2015/0163141 A1 Jun. 11, 2015

(51) Int. Cl.
*G06F 15/177* (2006.01)
*H04L 12/801* (2013.01)
*H04L 12/24* (2006.01)

(52) U.S. Cl.
CPC ............ *H04L 47/10* (2013.01); *H04L 41/0816* (2013.01)

(58) Field of Classification Search
USPC ................. 709/215, 221, 223, 230, 220, 224; 370/235
See application file for complete search history.

(56) References Cited

U.S. PATENT DOCUMENTS

| 6,067,300 | A * | 5/2000 | Baumert et al. ............... 370/413 |
| 6,625,157 | B2 * | 9/2003 | Niu et al. .................. 370/395.71 |
| 7,215,637 | B1 * | 5/2007 | Ferguson et al. .......... 370/230.1 |
| 7,725,680 | B1 | 5/2010 | Schmidt et al. |
| 2009/0207848 | A1 * | 8/2009 | Kwan et al. .................... 370/397 |
| 2012/0173945 | A1 | 7/2012 | Regula |

OTHER PUBLICATIONS

IBM, "Expandable Multi-Port Data Buffer", http://ip.com/IPCOM/000182383, Apr. 28, 2009, 4 pages.
IBM, "Shared Memory Architecture for EMSIP within a FPGA", http://ip.com/IPCOM/000212627, Nov. 21, 2011, 8 pages.
U.S. Appl. No. 14/306,861.

* cited by examiner

*Primary Examiner* — Michael Y Won
(74) *Attorney, Agent, or Firm* — Stephen R. Tkacs; Stephen J. Walder, Jr.; Thomas E. Tyson

(57) ABSTRACT

A mechanism is provided in a data processing system for shared buffer affinity for multiple ports. The mechanism configures a physical first-in-first-out (FIFO) buffer with a plurality of FIFO segments associated with a plurality of network ports. The plurality of network ports share the physical FIFO buffer. The mechanism identifies a FIFO segment under stress within the plurality of FIFO segments. The mechanism reconfigures the physical FIFO buffer to assign a portion of buffer space from a FIFO segment not under stress within the plurality of FIFO segments to the FIFO segment under stress.

18 Claims, 4 Drawing Sheets

FIFO AFFINITY FOR MULTIPLE PORTS

BACKGROUND

The present application relates generally to an improved data processing apparatus and method and more specifically to mechanisms for providing first-in-first-out buffer affinity for multiple port circuits.

Communications bridges, switches and routers used in computer networks use first-in-first-out buffers (FIFOs) to hold data packets in route to their next destination. Input/output (IO) adapters use FIFOs as a first hop from the network before data are placed into system memory. Typically at least one FIFO structure is used per network connection.

FIFOs are used commonly in electronic circuits for buffering and flow control from hardware to software. In hardware form a FIFO primarily consists of a set of read and write pointers, storage, and control logic. Storage may be dynamic random access memory (DRAM), flip-flops, latches, or any other suitable form of storage.

An application-specific integrated circuit (ASIC) is an integrated circuit (IC) customized for a particular use, rather than intended for general-purpose use. An ASIC for use in IO adapters may include a plurality of IO ports and one or more FIFOs to buffer data to be stored in a system memory.

SUMMARY

In one illustrative embodiment, a method, in a data processing system, is provided for shared buffer affinity for multiple ports. The method comprises configuring a physical first-in-first-out (FIFO) buffer with a plurality of FIFO segments associated with a plurality of network ports. The plurality of network ports share the physical FIFO buffer. The method further comprises identifying a FIFO segment under stress within the plurality of FIFO segments. The method further comprises reconfiguring the physical FIFO buffer to assign a portion of buffer space from a FIFO segment not under stress within the plurality of FIFO segments to the FIFO segment under stress.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide a mechanism for providing FIFO affinity for multiple port circuits. Modern server systems are more compact with consolidated IO resources. The trend is evident in the growing popularity and increasing density of IO adapters. However, FIFO resources on the IO adapters are not growing according to the trend. A FIFO buffer in an IO adapter is typically a dynamic random access memory (DRAM), which is the first data hop from the network before the data are stored into system memory via direct memory access (DMA).

Performance measurements and field experience thus far indicate that when multiple port IO adapters are in use, the IO requirements per port are quite different for each individual port. The FIFO design is either a dedicated resource for each port or a shared resource per circuit among multiple associated ports. In a multiport IO adapter with shared FIFO resources, the FIFO resources are split equally between ports with no exposed tunables. This leaves memory resources unused for some ports and starves other ports for resources. As a result, the starved ports experience DMA overruns and dropped packets. This is undesirable in customer environments, but unfortunately a common occurrence.

The illustrative embodiments provide a mechanism for exposing a shared FIFO buffer as a tunable resource under multiple configuration scenarios to more easily address customer IO needs in the compact/consolidated system space. In the case link aggregation, in response to a failed link, the mechanism may assign the FIFO buffer to the active link. In the case of a multiport ASIC being paired with a single physical port, the mechanism may assign the FIFO buffer to the single active port rather than splitting the FIFO 50/50. In another example embodiment, a device driver may detect and repartition the FIFO during peak times to create network and workload affinity. Given the bursty nature of network traffic, the mechanism allows for seamless and dynamic assignment of resources to best fit the customer workload.

Figure 1:
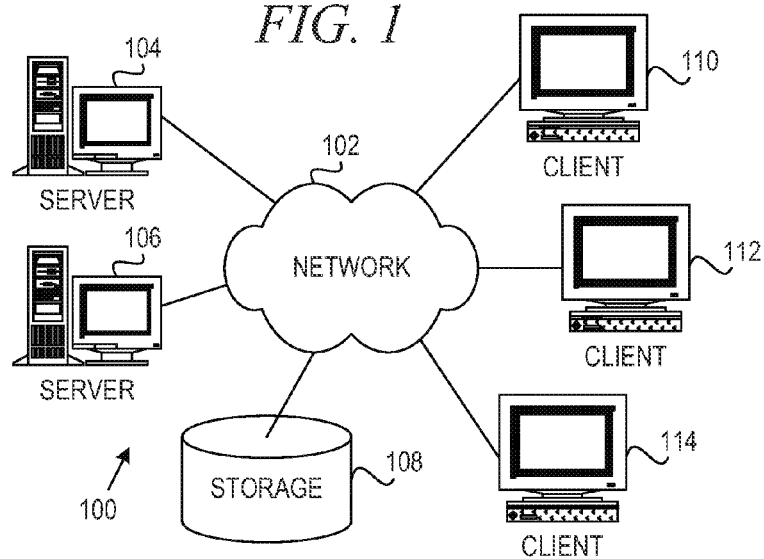
FIG. 1 depicts a pictorial representation of an example distributed data processing system in which aspects of the illustrative embodiments may be implemented.
Figure 2:
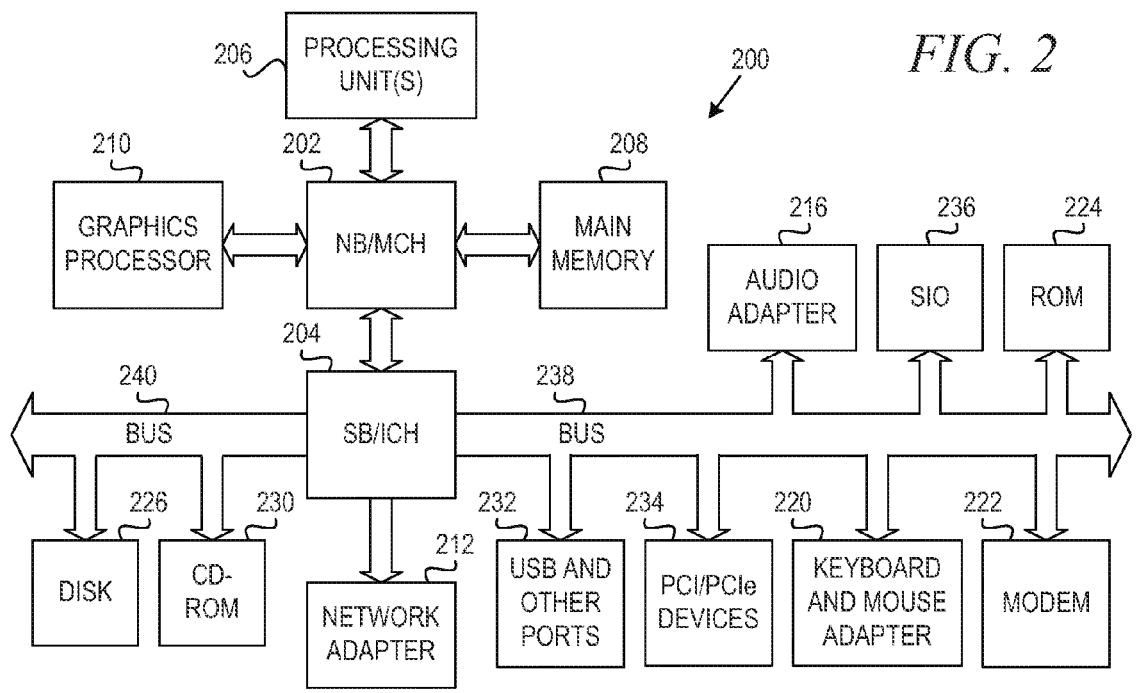
FIG. 2 is a block diagram of an example data processing system in which aspects of the illustrative embodiments may be implemented.

The illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented.

Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System P® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIGS. 3A-3D depict various configuration scenarios for a shared FIFO buffer in a multiport application specific integrated circuit in accordance with illustrative embodiments. With respect to FIG. 3A, application specific integrated circuit 310 comprises a plurality of ports 311, 312 with a shared first-in-first-out (FIFO) buffer 313. Ports 311, 312 may receive data from network 302 and buffer the received data in FIFO 313. That is, FIFO 313 buffers data to be stored in host memory 320.

Assuming a dual port ASIC with a shared FIFO and a 50/50 split, if only a single port is in use, then there is no benefit to only having 50% of the FIFO available for use. In this partial use example, the mechanism of the illustrative embodiments assigns the full FIFO to the active port. The shared FIFO may have a 50/50 distribution with both ports being part of a bonding/link aggregation (LaG) Upper Layer Protocol ULP). Link aggregation describes various methods of combining multiple network connections in parallel to increase throughput beyond what a single connection could sustain and to provide redundancy in case one of the links fails.

At a constant throughput, the performance of each link will be equivalent. However, if the link is lost on one port, such as port 1 311 in FIG. 3B, such that it is no longer an active member of the LaG, the throughput drops by 50%. Performance measurements may reveal that the FIFO 313 is the limiting factor for throughput. Thus, with the link to port 1 311 being lost, the mechanism dynamically reassigns the FIFO 313 from inactive port 1 311 to active port 2 312 for increased throughput.

Figure 3A:
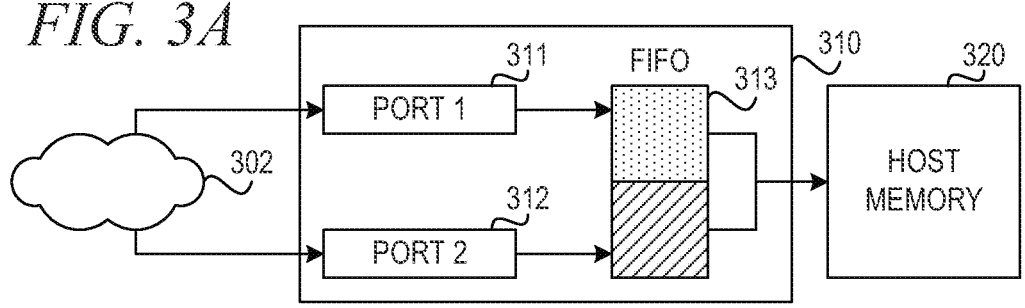
FIGS. 3A-3D depict various configuration scenarios for a shared FIFO buffer in a multiport application specific integrated circuit in accordance with illustrative embodiments.
Figure 3B:
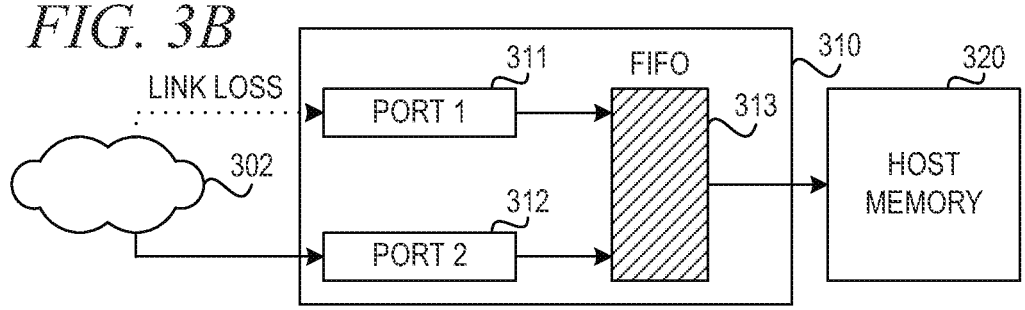
Figure 3C:
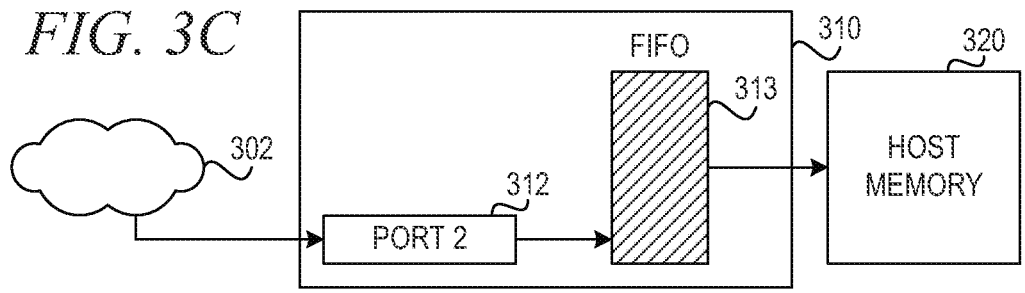

In another example configuration, an adapter with a multiport ASIC 310 may be paired with a single physical port 312. In the conventional model, FIFO 313 would still be split 50/50, hence wasting FIFO space on the adapter, which could be exploited for better performance if the FIFO 313 were tunable. Thus, as shown in FIG. 3C, the mechanism of the illustrative embodiment dynamically reassigns the entirety of FIFO 313 to port 2 312.

Figure 3D:
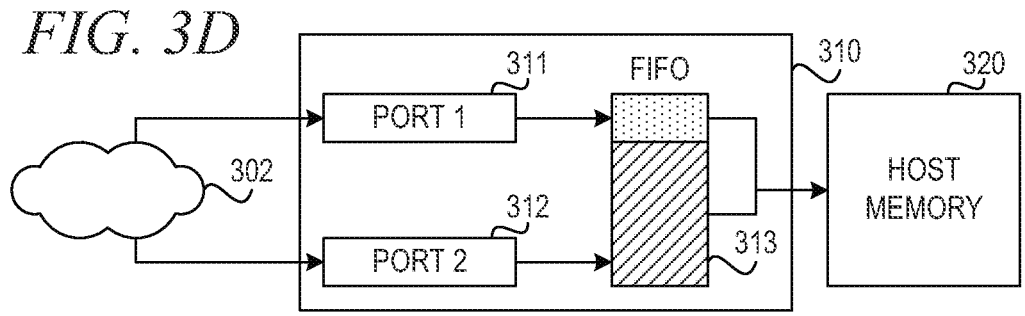

In another example configuration, a dual port adapter may have one port with heavier IO requirements than the other port during certain peak processing times. In accordance with an illustrative embodiment, a device driver (not shown) may include a feature to detect and repartition the FIFO during peak times to create network and workload affinity. For example, as seen in FIG. 3D, the mechanism of the illustrative embodiment may dynamically tune FIFO 313 for a 25/75 split. That is, the mechanism, which may be the device driver mentioned above, dynamically reassigns FIFO 313 to provide 25% of the buffer to port 1 311 and 75% of the buffer to port 2 312. Given the bursty nature of network traffic, the mechanism of the illustrative embodiment may allow for seamless and dynamic assignment of resources to best fit the customer workload.

Figure 4A:
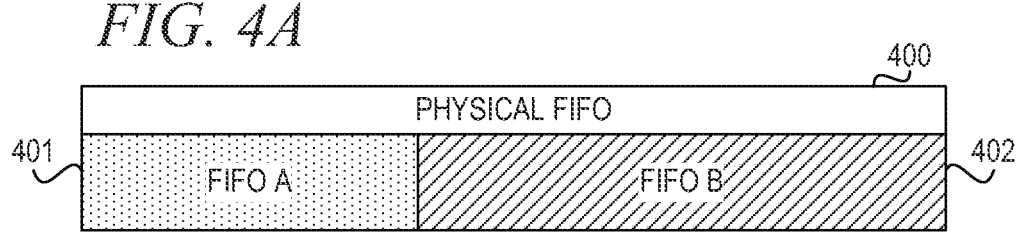
FIGS. 4A-4C illustrate dynamic reconfiguration of a FIFO buffer in accordance with the illustrative embodiments.
Figure 4B:
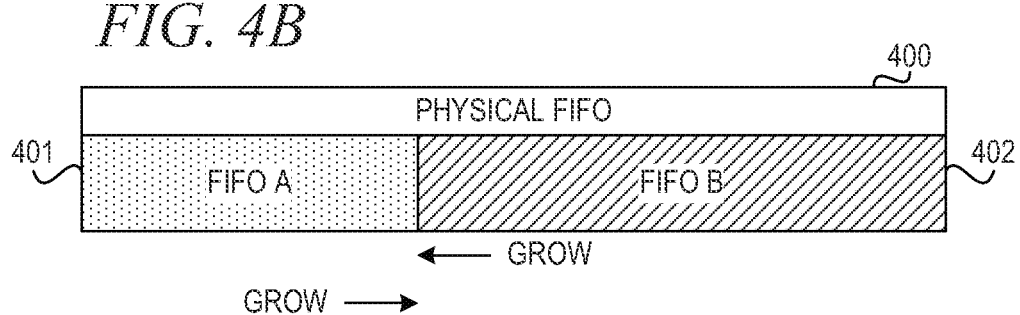
Figure 4C:
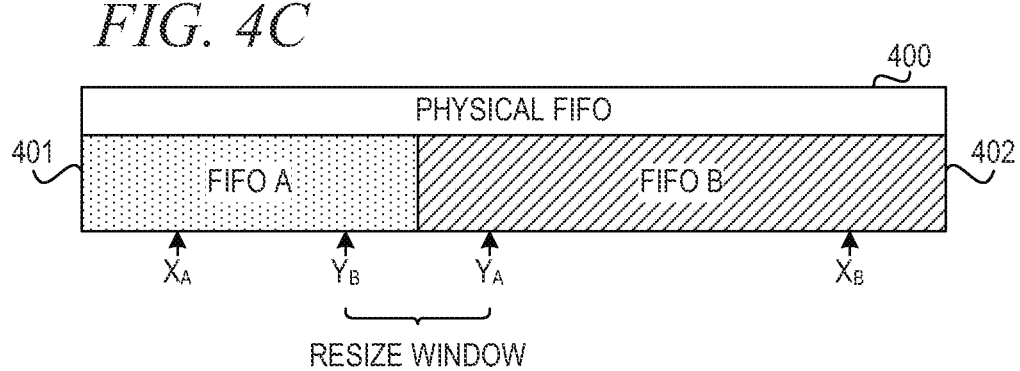

FIGS. 4A-4C illustrate dynamic reconfiguration of a FIFO buffer in accordance with the illustrative embodiments. With reference to FIG. 4A, physical FIFO 400 is shared between two ports, resulting in FIFO A 401 and FIFO B 402. While the depicted examples show two ports, the aspects of the illustrative embodiments may be applied to any number of ports. The FIFO segments 401, 402 are defined by start and end addresses. The mechanisms of the illustrative embodiments reconfigure the FIFO segments 401, 402 by adjusting the start and end addresses.

In one illustrative embodiment, a mechanism provides direct memory access (DMA) overrun normalization. For the depicted scenario of two ports sharing a common physical FIFO 400, each port has a set reserved amount of the FIFO space (FIFO A 401, FIFO B 402). As the mechanism detects DMA overruns, by monitoring existing hardware specific counter, for example, the mechanism increments the FIFO space for the FIFO under stress by dynamically removing space from the other FIFO. An "overrun error" occurs when the IO adapter cannot process data that just arrived before the data arrives. If the ASIC does not move data from the FIFO to the system memory quickly enough, then the buffer becomes full, and a DMA overrun error will occur. Thus, if FIFO A 401 is under stress (i.e., DMA overruns are detected), then the mechanism reassigns buffer space from FIFO B 402 to FIFO A 401.

This embodiment provides a free-flowing model where a FIFO under stress grows as needed until it receives back pressure from the other FIFO due to DMA overruns, as shown in FIG. 4B. This model is autonomic in the sense that it will automatically balance the split of the FIFO in affinity to the workload at hand. Thus, as the workload changes, so does the FIFO split to ensure maximum hardware efficiency.

If the ASIC has more than two ports associated with a shared FIFO, a slightly more elaborate model is needed, which simply monitors the FIFOs with free space to cede to the FIFOs under stress. The mechanism reconfigures the FIFO segments 401, 402, for example, by changing the start address of FIFO B 402 when FIFO segment 402 is quiesced and then assigning it to the contiguous upper bound of FIFO A 401. A mechanism for dividing physical FIFO by the number of ports and balancing the FIFOs based on stress and free space is straightforward. Such a mechanism may simply shift start and end addresses for each affected FIFO segment.

Turning to FIG. 4C, a watermark balancing mechanism is illustrated in accordance with one example embodiment. A user specifies high and low watermarks at device provisioning time. This model allows for predefined bounds of each FIFO segment 401, 402. At runtime, the mechanism may use a DMA overrun model for dynamic resize within the specified bounds.

As shown in FIG. 4C, $X_A$ defines the low watermark for FIFO A 401, and $X_B$ defines the low watermark for FIFO B 402. The low watermark describes the lower bound of the FIFO segment size to ensure proper operation. Also, $Y_A$ defines the high watermark for FIFO A 401, and $Y_B$ defines the high watermark for FIFO B 402. The high watermark describes the high threshold for save operation. The resize window is the space usable for reconfiguring the FIFO segments 401, 402. In most cases, the resize window is the space between $Y_B$ and $Y_A$. However, if for example the high watermark for FIFO B, $Y_B$, goes beyond a low watermark for FIFO A, $X_A$, the resize window will be $X_A$ and $Y_B$.

The above aspects and advantages of the illustrative embodiments of the present invention will be described in greater detail hereafter with reference to the accompanying figures. It should be appreciated that the figures are only intended to be illustrative of exemplary embodiments of the present invention. The present invention may encompass aspects, embodiments, and modifications to the depicted exemplary embodiments not explicitly shown in the figures but would be readily apparent to those of ordinary skill in the art in view of the present description of the illustrative embodiments.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium is a system, apparatus, or device of an electronic, magnetic, optical, electromagnetic, or semiconductor nature, any suitable combination of the foregoing, or equivalents thereof. More specific examples (a non-exhaustive list) of the computer readable storage medium would include the following: an electrical device having a storage capability, a portable computer diskette, a hard disk, a random access memory (RAM), a read-only memory (ROM), an erasable programmable read-only memory (EPROM or Flash memory), an optical fiber based device, a portable compact disc read-only memory (CDROM), an optical storage device, a magnetic storage device, or any suitable combination of the foregoing. In the context of this document, a computer readable storage medium is any tangible medium that can contain or store a program for use by, or in connection with, an instruction execution system, apparatus, or device.

In some illustrative embodiments, the computer readable medium is a non-transitory computer readable medium. A non-transitory computer readable medium is any medium that is not a disembodied signal or propagation wave, i.e. pure signal or propagation wave per se. A non-transitory computer readable medium may utilize signals and propagation waves, but is not the signal or propagation wave itself. Thus, for example, various forms of memory devices, and other types of systems, devices, or apparatus, that utilize signals in any way, such as, for example, to maintain their state, may be considered to be non-transitory computer readable media within the scope of the present description.

A computer readable signal medium, on the other hand, may include a propagated data signal with computer readable program code embodied therein, for example, in a baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Similarly, a computer readable storage medium is any computer readable medium that is not a computer readable signal medium.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 5:
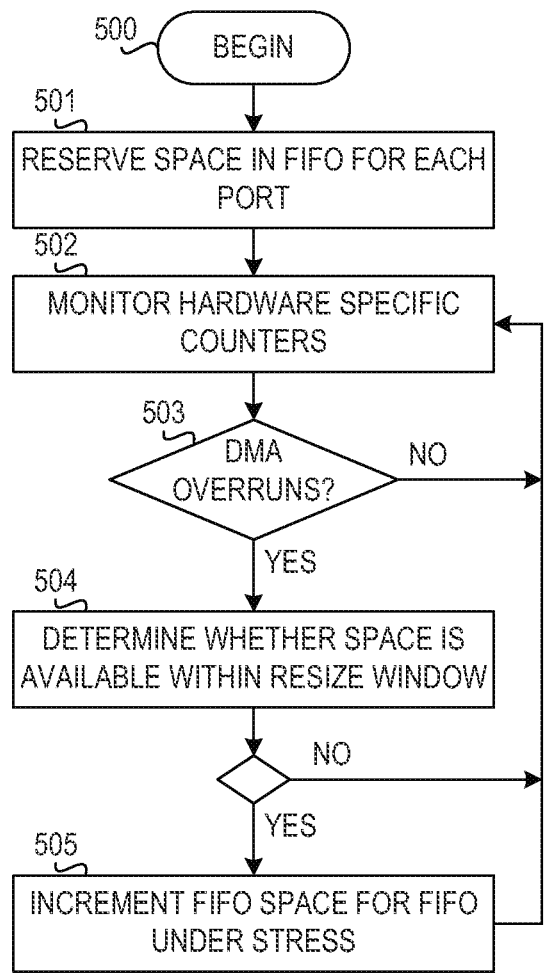
FIG. 5 is a flowchart illustrating operation of a mechanism for FIFO affinity for multiple port applications specific integrated circuits in accordance with an illustrative embodiment.

FIG. 5 is a flowchart illustrating operation of a mechanism for FIFO affinity for multiple port applications specific integrated circuits in accordance with an illustrative embodiment. Operation begins (block 500), and the mechanism initially reserves space for a FIFO segment in the physical FIFO for each port (block 501). The mechanism then monitors hardware specific counters to identify a buffer under stress (block 502). The mechanism determines whether DMA overrun errors are detected based on the hardware specific counters (block 503). If no DMA overruns are detected, operation returns to block 502 to monitor hardware specific counters.

If the mechanism detects DMA overruns in block 503, the mechanism determines whether space is available within the resize window to increment the segment size of the FIFO under stress (block 504). The mechanism may determine whether space is available by determining whether a FIFO segment other than the FIFO under stress has free space to cede to the FIFO under stress. Alternatively, the mechanism may determine whether space is available between the high watermarks of the FIFO segments, up to the low watermark of the FIFO not under stress. If the mechanism determines there is no space available within the resize window in block 504, operation returns to block 502 to monitor hardware specific counters.

If the mechanism determines there is space available within the resize window in block 504, the mechanism increments the FIFO space for the FIFO under stress (block 505). The mechanism may increment the FIFO space for the FIFO under stress by changing the start and end addresses of the FIFO segments when the FIFO segments are quiesced. Thereafter, operation returns to block 502 to monitor hardware specific counters.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising a non-transitory computer readable medium having a computer readable program stored therein, wherein the computer readable program, when executed on a computing device, causes the computing device to:
   configure a physical first-in-first-out (FIFO) buffer with a plurality of FIFO segments associated with a plurality of network ports, wherein the plurality of network ports share the physical FIFO buffer;
   identify a FIFO segment under stress within the plurality of FIFO segments, wherein each of the FIFO segment under stress and a FIFO segment not under stress have a user specified high watermark;
   determining whether space is available within a resize window to allocate to the FIFO segment under stress wherein the resize window comprises buffer space between the high watermark of the FIFO segment under stress and the high watermark of the FIFO segment not under stress; and
   reconfigure the physical FIFO buffer to assign a portion of buffer space from a FIFO segment not under stress within the plurality of FIFO segments to the FIFO segment under stress.

2. The computer program product of claim 1, wherein identifying the FIFO segment under stress comprises determining the plurality of network ports are part of a link aggregation and a network link of a network port associated with the FIFO segment not under stress is lost.

3. The computer program product of claim 2, wherein reconfiguring the physical FIFO buffer comprises assigning the entire physical FIFO buffer to the FIFO segment under stress.

4. The computer program product of claim 1, wherein identifying the FIFO segment under stress comprises determining a network port associated with the FIFO segment not under stress is unused.

5. The computer program product of claim 4, wherein reconfiguring the physical FIFO buffer comprises assigning the entire physical FIFO buffer to the FIFO segment under stress.

6. The computer program product of claim 1, wherein identifying the FIFO segment under stress comprises:
   monitoring hardware specific counters for the plurality of FIFO segments; and
   detecting one or more direct memory access (DMA) overrun errors associated with the FIFO segment under stress.

7. The computer program product of claim 1, wherein reconfiguring the physical FIFO buffer comprises determining whether the FIFO segment not under stress has free space to cede to the FIFO segment under stress.

8. The computer program product of claim 1, wherein each of the FIFO segment under stress and the FIFO segment not under stress have a user specified low watermark.

9. The computer program product of claim 8, wherein determining whether space is available within the resize window determines whether space is available up to the low watermark of the FIFO segment not under stress.

10. An apparatus comprising:
    a processor; and
    a memory coupled to the processor, wherein the memory comprises instructions which, when executed by the processor, cause the processor to:
    configure a physical first-in-first-out (FIFO) buffer with a plurality of FIFO segments associated with a plurality of network ports, wherein the plurality of network ports share the physical FIFO buffer;
    identify a FIFO segment under stress within the plurality of FIFO segments, wherein each of the FIFO segment under stress and a FIFO segment not under stress have a user specified high watermark;
    determining whether space is available within a resize window to allocate to the FIFO segment under stress, wherein the resize window comprises buffer space between the high watermark of the FIFO segment under stress and the high watermark of the FIFO segment not under stress; and reconfigure the physical FIFO buffer to assign a portion of buffer space from a FIFO segment not under stress within the plurality of FIFO segments to the FIFO segment under stress.

11. The apparatus of claim 10, wherein identifying the FIFO segment under stress comprises determining the plurality of network ports are part of a link aggregation and a network link of a network port associated with the FIFO segment not under stress is lost.

12. The apparatus of claim 11, wherein reconfiguring the physical FIFO buffer comprises assigning the entire physical FIFO buffer to the FIFO segment under stress.

13. The apparatus of claim 10, wherein identifying the FIFO segment under stress comprises determining a network port associated with the FIFO segment not under stress is unused.

14. The apparatus of claim 13, wherein reconfiguring the physical FIFO buffer comprises assigning the entire physical FIFO buffer to the FIFO segment under stress.

15. The apparatus of claim 10, wherein identifying the FIFO segment under stress comprises:

monitoring hardware specific counters for the plurality of FIFO segments; and detecting one or more direct memory access (DMA) overrun errors associated with the FIFO segment under stress.

16. The apparatus of claim 10, wherein reconfiguring the physical FIFO buffer comprises determining whether the FIFO segment not under stress has free space to cede to the FIFO segment under stress.

17. The apparatus of claim 10, wherein each of the FIFO segment under stress and the FIFO segment not under stress have a user specified low watermark.

18. The apparatus of claim 17, wherein determining whether space is available within the resize window determines whether space is available up to the low watermark of the FIFO segment not under stress.

\* \* \* \* \*